Nov. 18, 1969 E. W. TURNER 3,478,388
APPARATUS FOR BLOW MOLDING, CUTTING AND SEALING
Filed Nov. 21, 1966 4 Sheets-Sheet 1

INVENTOR.
E.W. TURNER

BY Young & Quigg

ATTORNEYS

Nov. 18, 1969  E. W. TURNER  3,478,388
APPARATUS FOR BLOW MOLDING, CUTTING AND SEALING
Filed Nov. 21, 1966  4 Sheets-Sheet 3

INVENTOR.
E. W. TURNER
BY  Young + Quigg
ATTORNEYS

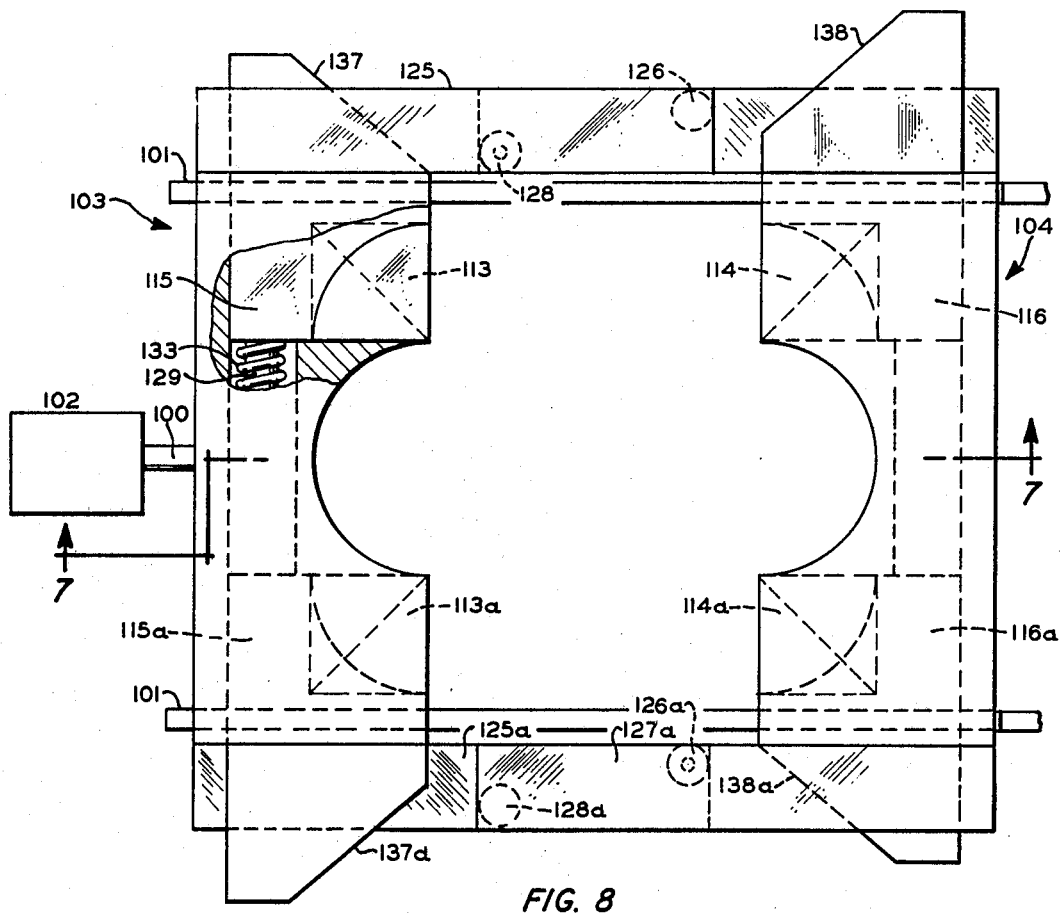

United States Patent Office 3,478,388
Patented Nov. 18, 1969

3,478,388
APPARATUS FOR BLOW MOLDING, CUTTING AND SEALING
Edward W. Turner, Somers, Conn., assignor to Phillips Petroleum Company, a corporation of Delaware
Filed Nov. 21, 1966, Ser. No. 595,910
The portion of the term of the patent subsequent to July 2, 1985, has been disclaimed
Int. Cl. B29d 23/03
U.S. Cl. 18—5                6 Claims

ABSTRACT OF THE DISCLOSURE

In a blow molding operation wherein a thermoplastic parison is closed off at one end and thereafter expanded by the introduction of internal fluid pressure to conform to a mold, the tube is sealed and severed by at least three jaws which converge toward a central point. This sealing means is particularly useful in sealing thermoplastic parisons which have been cooled and thereafter reheated to a temperature near but below the crystalline melting point of the thermoplastic material.

---

This invention relates to cutting and sealing plastic tubes. In another aspect, this invention relates to a novel apparatus for cutting and sealing parisons employed in the manufacture of hollow plastic articles by blow molding. In another aspect, this invention relates to a novel apparatus for cutting and sealing thermoplastic tubes.

The most common technique used to form hollow plastic articles is blow molding. In one such technique, a molten parison of plastic material extrudes from an annular die between a two part (split) blow mold which closes together about the parison, pinching off and sealing the open end thereof along a single line where the two mold sections meet, and a fluid is introduced into an enclosed parison to expand and shape the parison to the mold cavity. In another blow molding technique a tubular thermoplastic parison which has been cooled to below its crystalline freeze point and then heated to a temperature near to but below its crystalline melt point, and which is still in a predominantly crystalline condition, is supported on one end by a gripping means, which may also be a forming means, with a centrally located blowing tube, and is placed between a two part (split) blow mold which closes together about the parison, sealing and pinching off the open end thereof along a single line as described above. This type of pinching off and sealing operation substantially flattens the closed end of the parison and causes a mass of polymer to accumulate at the ends of the pinch off line due to the walls of the parison being forced towards the ends of the line. This results in thick areas at the ends and thin areas between the ends of the pinch off line, which in turn results in a weaker area of seal between the ends of the pinch off line. This weaker seal area contributes to container wall weakness and consequent premature failure on drop impact. This weaker seal has particularly been a problem where the seal is attempted in the predominantly crystalline parisons mentioned above. Another conventional method of cutting and sealing a parison is to utilize a one way nip-off, which in effect utilizes shearing force against one side of the heated tube to force that side of the parison wall against the other side and thereby seal the sides together before the leading end of the parison is pinched off. This method results in a rather large area of the parison wall directly affected by the seal, and relatively large "ears" or flanges that appear at the ends of the nip-off line and detracts somewhat from the appearance of the completed article. Therefore, it is highly desirable to have a method of cutting and sealing parisons that will minimize the area which is directly affected by a single direction of seal, and at the same time complete a seal in which the plastic walls in the area of the seal have no resulting thin areas of wall thickness along the line of seal.

Accordingly, one object of this invention is to provide a novel apparatus for cutting and sealing plastic tubes.

Another object of this invention is to provide an apparatus for obtaining improved hollow plastic articles.

A further object of this invention is to provide a novel apparatus for cutting and sealing a heated thermoplastic parison, and to thereby increase the strength of the seal by obtaining uniform distribution of the plastic over the seal area.

Other objects and advantages of this invention will be apparent to one skilled in the art from a study of this disclosure.

According to the invention, the walls of a heated thermoplastic tube are forced together from at least three directions to thereby form a seal having a multi-line configuration. The walls are then pinched off below the seal line to yield a sealed parison. This multi-directional force is attained by at least three cutting and sealing jaws, acting in concert and closing together about the parison toward a central point.

According to one embodiment of this invention, a novel split section blow molding apparatus is provided whereby the leading portion of a heated thermoplastic parison is sealed in at least three directions and then pinched off by at least three cutting and sealing jaws mechanically activated to close about, seal and then cut the said leading portion of the heated parison when the split sections of the blow molding apparatus are forced together.

According to another embodiment of this invention, a novel tube sealing apparatus is provided whereby an open end of a heated thermoplastic tube is sealed in at least three directions and then pinched off by at least three cutting and sealing jaws that are mechanically activated to close about, form a seal having a multi-line configuration and then pinch off the said end of the thermoplastic tube.

This invention can better be illustrated by a study of the drawings in which:

FIGURE 7 is a sectional view of another embodiment of this invention showing a tube sealing and cutting device that is hydraulically activated.

FIGURE 8 is a plan view of the apparatus of FIGURE 7.

Figure 1:
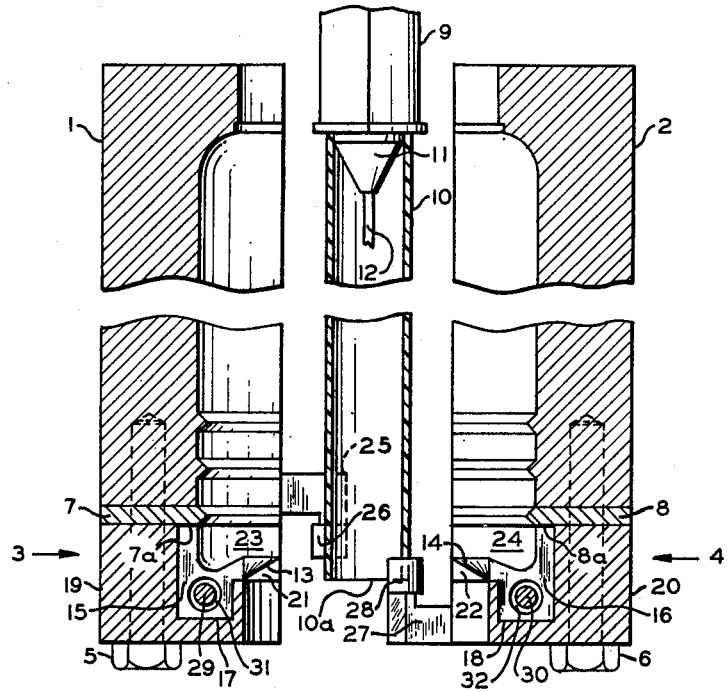
FIGURE 1 is a vertical section of a split blow molding device having a parison sealing and cutting apparatus of this invention attached thereto.

Now referring to FIGURE 1, there is illustrated a sectional view of a bottle blow molding apparatus comprising sections 1 and 2 with the parison sealing and cutting device sections 3 and 4 operatively attached thereto. Sealing and cutting sections 3 and 4 are attached to mold sections 1 and 2 by bolts represented by 5 and 6, respectively. Plate 7 is interconnected between section 3 and mold section 1, and plate 8 is interconnected between section 4 and mold section 2. Tubular thermoplastic parison 10, which has been heated but is a predominantly crystalline condition, is clamped between jaws 9 and member 11

The exterior portions of jaws 9 fit in the upper portions of sections 1 and 2 as the said sections 1 and 2 are moved together. Leading end 10a is open, and air is injected into parison 10 from blow tube 12, following the closing of the mold, to form the parison to the shape of the mold. Sealing and cutting jaws 13 and 14 on sliding blocks 15 and 16, respectively, coact to force the walls of parison 10 together, seal adjacent wall sections to each other, and then pinch off the portion below the line of seal when sections 1 and 2 are moved together. As illustrated, the upper portions of sliding blocks 15 and 16 are in slideable contact with plates 7 and 8 at points 7a and 8a, respectively. The lower portions of sliding blocks 15 and 16 rest in grooves 17 and 18 of base members 19 and 20, respectively. The underside of sealing and cutting jaw 13 forms cutout 21 and the underside of sealing and cutting jaws 14 forms cutout 22 for receiving excess parison. Concave surfaces 23 and 24 define one-half of the lower portion of the mold cavity when the mold is in closed position. Lever arm 27 carrying roller 28 is connected to the outer end of base member 20 and lever arm 25 carrying roller 26 is connected to mold section 1 at a point above the place where plate 7 intersects with mold section 1. As sections 1 and 2 close, rollers 26 and 28 contact pressure bearing surfaces on sliding blocks 16 and 15, respectively, to cause sliding blocks to slide laterally in grooves 17 and 18. The pressure bearing surfaces on sliding blocks 16 and 15 are held against rollers 26 and 28 during the closing operation by the action of compressive springs around guide rods 29 and 30 contained within conduits 31 and 32, respectively.

Figure 2:
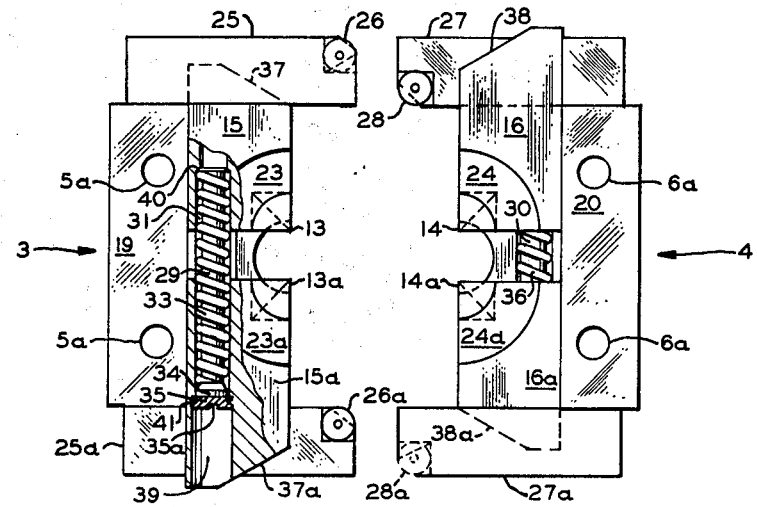
FIGURE 2 is a view partially in section of the parison sealing and cutting device of FIGURE 1 having four sealing and cutting jaws in open position with suitable activating means.
Figure 3:
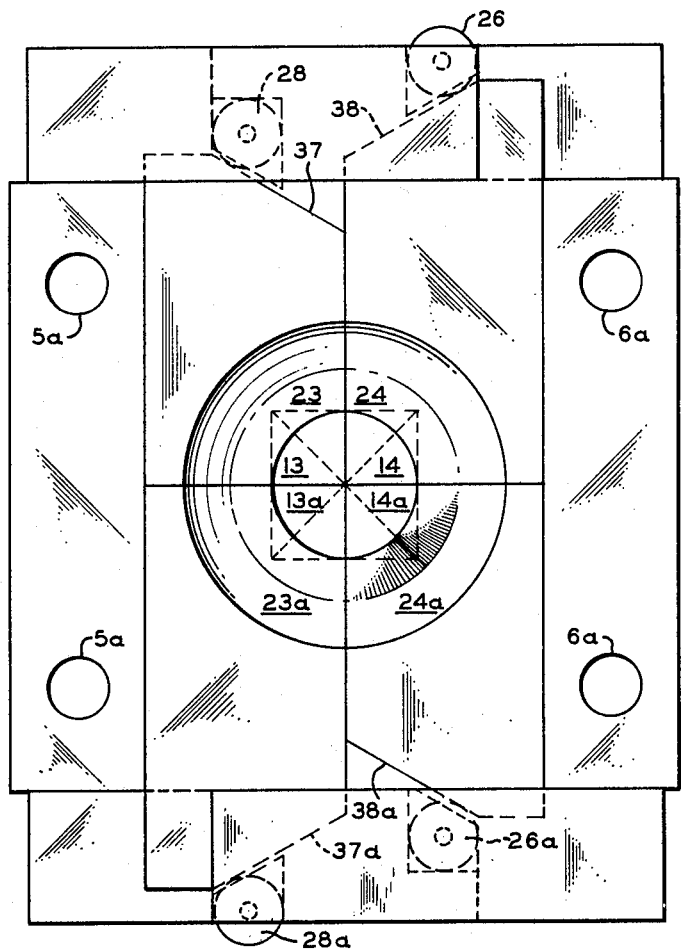
FIGURE 3 is a plan view of the apparatus of FIGURE 2 showing the sealing and cutting jaws in closed position and the activating means fully engaged.

The construction and operation of sealing and cutting sections 3 and 4 are illustrated in FIGURES 2 and 3.

Referring to FIGURE 2 in detail, there is shown sections 3 and 4 of a parison sealing and cutting apparatus normally attached to the bottom portion of a split mold apparatus as shown in FIGURE 1. Apertures 5a through base member 19, and apertures 6a through base member 20 are provided as receptacles for connecting bolts 5 and 6, respectively that secure the cutting device to the respective mold sections. Sealing and cutting jaws 13, 13a, 14, and 14a are shown aligned in open position for receiving a heated thermoplastic tube. As shown, sealing and cutting jaws 13, 13a, and 14 and 14a comprise the interior leading portions of sliding blocks 15, 15a, 16, and 16a, respectively. The bottom portions of sliding blocks 15 and 15a fit in slidable contact grooves in base member 19 and the bottom portions of sliding blocks 16 and 16a fit in slidable contact in grooves on base member 20. The element of sliding blocks 15, 15a, 16 and 16a as illustrated in FIGURE 2 comprise: sealing and cutting jaws 13, 13a, 14 and 14a, respectively; pressure bearing surfaces 37, 37a, 38 and 38a, respectively; and concave surfaces 23, 23a, 24 and 24a, respectively. Sliding blocks 13 and 13a are shown partially in section to illustrate conduits 31 and 39, respectively, extending therethrough.

Guide rod 29 and compressive spring 33 are contained within conduits 31 and 39 in sliding blocks 15 and 15a, respectively. Guide rod 30 and compressive spring 36 are contained within similar conduits through sliding blocks 16 and 16a. Guide rod 29 rests on guide plug 34. Containing plug 35 having driving groove 35a is screwed into the threaded portion 41 of conduit 39 within sliding block 15a. Conduit 31 within sliding block 15 narrows in diameter at point 40 to provide a stop for spring 33. The action of compressive spring 33 upon stop 40 will tend to force sliding blocks 15 and 15a apart at all times. Lever arms 25a and 27 having rollers 26a and 28 are connected to base members 19 and 20, respectively. Lever arms 25 and 27a having rollers 26 and 28a are connected to the upper portion of a respective mold section in a manner not shown in FIGURE 2.

Thus, in the operation of the device, sections 3 and 4 are forced together causing rollers 26, 26a, 28 and 28a to contact pressure bearing surfaces 38, 38a, 37 and 37a, respectively. As more force is applied to sections 3 and 4, the rollers will tend to roll on the respective bearing surfaces and force the sliding blocks together in the grooves in the respective base members thereby causing compressive springs 33 and 36 to contract.

Sections 3 and 4 are shown in closed position in FIGURE 3. Rollers 26, 26a, 28 and 28a are shown in contact with pressure bearing surfaces 38, 38a, 37 and 37a, respectively. Compressive springs 33 and 36 (not shown) are fully compressed and sealing and cutting jaws 13, 13a, 14 and 14a are aligned in closed position. Concave surfaces 23, 23a, 24 and 24a are shown aligned in closed position to thereby define the lower portion of the mold cavity.

Figure 4:
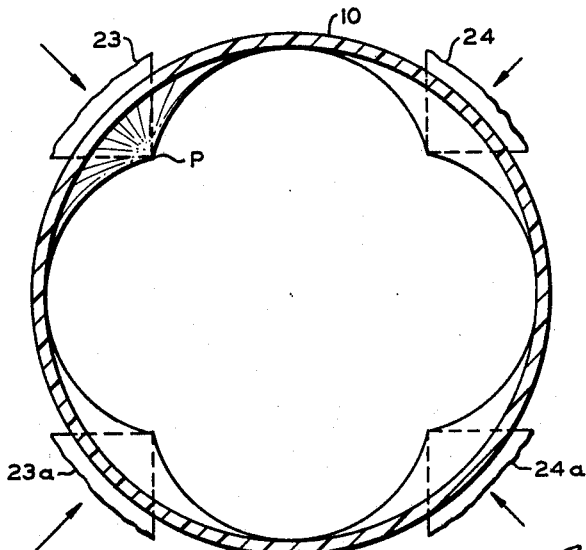
FIGURES 4–6 illustrate the action of the sealing and cutting jaws when forming a multi-directional seal.
Figure 5:
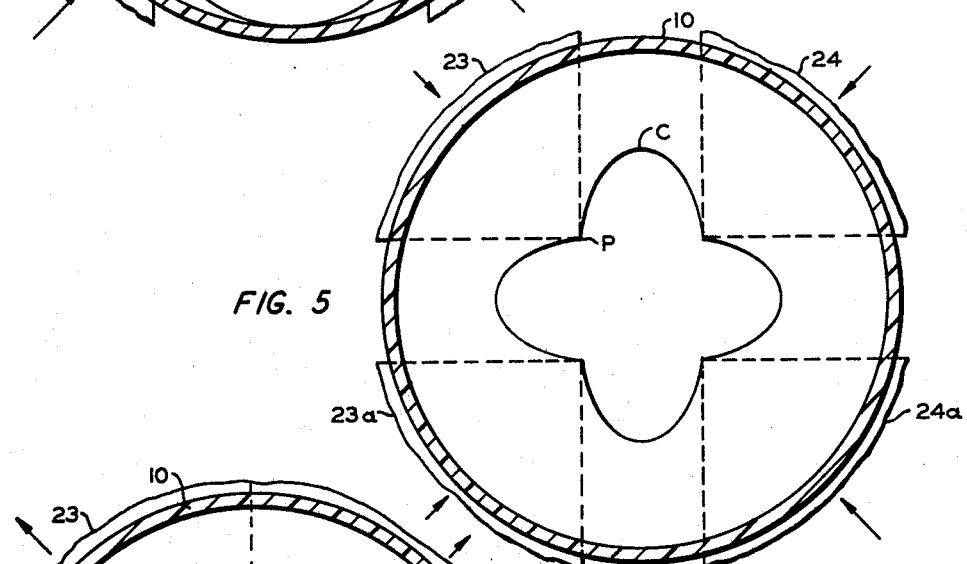
Figure 6:
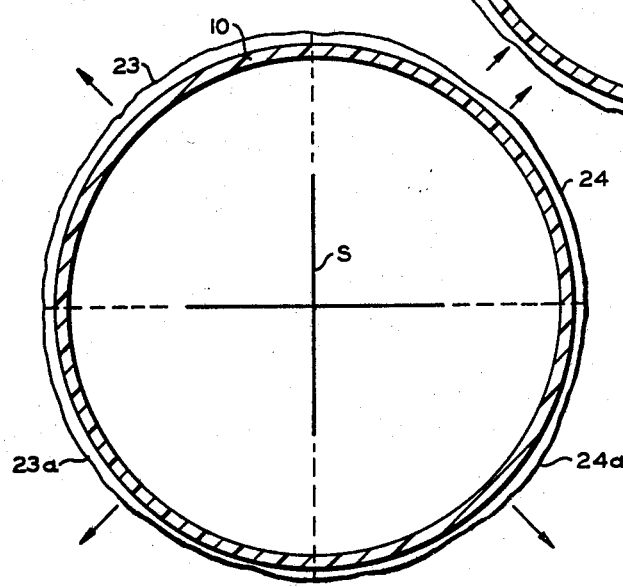

The action of the sealing and cutting jaws in forming the multi-directional seal is shown by FIGURES 4–6 which are diagrammatic illustrations showing the various configurations of the thermoplastic tubular wall section during the seal forming and pinching off operation. Referring now to FIGURE 4, as sealing and cutting jaws on sliding blocks 24, 24a, 23 and 23a travel along the paths as illustrated by the arrows which are substantially perpendicular to and have points of convergence near the longitudinal axis of tube 10, the walls of tube 10 are forced inwardly at points P.

FIGURE 5 illustrates the position of points P when the sealing and cutting jaws are in the half closed position. It will be noted, that as the tube walls are being forced together, there is a uniform stretching of the tube walls around the circumference near points P and C. This action will result in a seal near the longitudinal axis of the tube having uniform wall thickness in the wall sections that are sealed together.

FIGURE 6 illustrates seal S formed as the sealing and cutting jaws come to the closed position. The tube walls are forced together in eight directions by the action of the four sealing and cutting blocks traveling along four different paths to the common junction near the longitudinal axis of the tube. The action of the sealing and cutting jaws converging will also pinch off the lower portion of tube 10 from the resulting sealed upper portion. It can readily be seen that in this method of sealing parisons wherein adjacent wall sections are stretched and forced together near the longitudinal axis of the parison, the parison wall area which is directly affected by a single direction of seal is minimized, and at the same time a seal is effected between adjacent parison walls of uniform thickness. Bottles formed from parisons sealed in this manner exhibit substantially higher base strength and a lower failure rate upon drop impact than containers having bases sealed by the one way or two way nip-off method.

FIGURE 7 is a sectional view along line 7—7 of FIGURE 8 which is a top view of another embodiment of this invention showing a hydraulically activated tube cutting and sealing device. This device is similar to the one shown in FIGURES 1–3 except that it operates independently of a molding apparatus, and is used to cut and seal thermoplastic tube sections. Thermoplastic tube sections cut and sealed by this embodiment can be used as performed parisons for use in blow molding, containers, or for use in fluid piping operations. Referring now to FIGURE 7, sliding blocks 115 and 116 in this embodiment are similar to the sliding blocks 15 and 16 in the device of FIGURES 1–3 except upper portions of sliding blocks 115 and 116, respectively, are adapted to fit in slidable contact similarly to lower portions thereof within body members 119 and 120, respectively, and the concave portions which cooperate to define the lower portions of the mold device are eliminated. Guide rods 129 and 130 having springs thereon are inserted in conduits within sliding blocks 115 and 116 in a similar manner as guide rods 29 and 30 within sliding blocks 15 and 16 of FIGURES 1–3. Body members 119 and 120 have also been modified to cooperate with modified blocks 115 and 116. As shown, body member 119 supports lever arm 125, and body member 120 supports lever arm 127. Section 104 is shown in stationary positon, and section 103 is movable in response to the motion of piston rod 100 of hydraulic cylinder 102.

As stated, FIGURE 8 is a top view of this embodiment comprising sections 103 and 104 and hydraulic cylinder 102. FIGURE 8 is partly in section to show guide rod 129 and compressive springs 133. Section 104 is held in stationary position while section 103 slides on guide rails 101 in response to the motion of piston rod 100 operatively attached thereto. Guide rails 101 fit within grooves on the underside of section 103.

Thus, in the operation of this device, a heated plastic tube is placed between sections 103 and 104. Hydraulic piston rod 100 is activated to force section 103 toward section 104, this movement being guided by guide rails 101. Rollers 126, 126a, 128 and 128a then contact pressure bearing surfaces 138, 138a, 137 and 137a, respectively, and further lateral movement of section 103 causes sealing and cutting jaws 113 and 113a on sliding blocks 115 and 115a and sealing and cutting jaws 114 and 114a on sliding blocks 116 and 116a to move together. Therefore, the movement of section 103 toward section 104 coupled with the inward movements of cutting and sealing jaws 113, 113a, 114, 114a will cut and seal the hot thermoplastic tube located therebetween. It must be noted that the use of one hydraulic cylinder as shown in FIGURES 7 and 8 is not intended to limit the scope of this invention. This device can operate with two movable sections operated by two hydraulic cylinders or mechanical screws or mechanical levers, or in any suitable manner that will force the respective sections together. Also, the device illustrated in FIGURES 7 and 8 can be used to cut solid thermoplastic material in the form of round or octagonal rods, but the device has its greatest utility in cutting and sealing hot thermoplastic tubular objects because the resulting seal will have a multi-line configuration with no uneven thick or thin stressed areas therein.

It must be noted that the particular devices illustrated in FIGURES 1–3 and 7–8 are not intended to limit the scope of this invention. The drawings illustrate the cutting device having two sections and two movable blades in each section; however, variations can be made from this without departing from the scope of this invention. For example, this device is operable when only one of the cutting sections has movable blades therein, and the other section has one non-movable blade. This configuration would be used where a 3-way nip-off is required. Also, several movable blades can be utilized in any one section. For example, guide rod 29 or 30 can extend through three or more movable blocks, with individual compressive spring means theron and separating each individual movable block. For example, when utilizing three movable blocks in a mold section, a compressive spring means will be placed between the first and second blocks and a second compressive spring means will be placed between the second and third blocks.

I claim:
1. In a blow molding apparatus comprising in combination a pair of mold sections, means to introduce a thermoplastic tube therebetween a plurality of jaw means to clamp around the first end of said thermoplastic tube between the first ends of said mold sections, means to introduce a forming fluid within said tube, means to exhaust a forming fluid from the said tube, improvements comprising, at least three pointed sealing and cutting jaws movably positioned at the second ends of said mold sections to radially converge when actuated along different paths having a common junction near the longitudinal axis of said blow molding apparatus formed by said mold sections moving together.

2. The apparatus of claim 1 having at least two of said sealing and cutting jaws movably positioned in a plane at the bottom of one of said mold sections, and pressure actuating means to force said movably positioned sealing and cutting jaws together in said plane.

3. The apparatus of claim 2 wherein said movably positioned blades are spaced apart by a spring means when pressure is not being applied thereto.

4. In a blow molding apparatus comprising in combination a pair of mold sections, means to introduce a thermoplastic tube therebetween, means to clamp a first end of said thermoplastic tube between a first end of said mold sections, and means to introduce a forming fluid within said tube, the improvement comprising: at least three sealing and cutting jaws movably positioned at second ends of said mold sections, at least two of said sealing and cutting jaws being movably positioned in a plane at the bottom of one of said mold sections, said at least two jaws being spaced apart by a spring means, lever arm means operatively attached to the mold section adjacent said mold section having said movably positioned sealing and cutting jaws therein, pressure bearing means operatively positioned to move said movably positioned sealing and cutting jaws, said pressure bearing means being operatively positioned to contact said adjacent lever arm means and inclined to thereby cause said movably positioned sealing and cutting jaws to move together in said planes when the adjacent split mold sections are forced together thus causing said jaws to converge at a common junction near a longitudinal axis of said mold sections.

5. The apparatus of claim 4 wherein said lever arm means have roller means operatively attached thereto, said roller means operatively positioned to contact adjacent pressure bearing means and roll thereon when the split mold sections are forced together.

6. The apparatus of claim 5 wherein each mold section has two cutting and sealing jaws movably positioned in a plane at the bottom thereof.

References Cited

UNITED STATES PATENTS 2,320,272  5/1943  Friden _____ 83—54
2,940,121  6/1960  Sherman.
3,319,291  5/1967  Schaich.

WILBUR L. McBAY, Primary Examiner

U.S. Cl. X.R.

18—19; 83—54, 627; 264—163